(12) United States Patent
Tiller et al.

(10) Patent No.: US 8,426,012 B2
(45) Date of Patent: *Apr. 23, 2013

(54) CHIRAL LIQUID CRYSTAL POLYMER MARKING

(75) Inventors: Thomas Tiller, Bussigny (CH); Frédéric Gremaud, Epagny (CH); Andrea Callegari, Chavannes-près-Renens (CH)

(73) Assignee: Sicpa Holding SA, Prilly (CH)

( * ) Notice: Subject to any disclaimer, the term of this patent is extended or adjusted under 35 U.S.C. 154(b) by 350 days.

This patent is subject to a terminal disclaimer.

(21) Appl. No.: 12/783,078

(22) Filed: May 19, 2010

(65) Prior Publication Data

US 2011/0135890 A1    Jun. 9, 2011

Related U.S. Application Data

(60) Provisional application No. 61/267,668, filed on Dec. 8, 2009.

(51) Int. Cl.
| | |
|---|---|
| *B41M 5/28* | (2006.01) |
| *B41M 3/14* | (2006.01) |
| *B42D 15/10* | (2006.01) |
| *G02F 1/137* | (2006.01) |
| *C09K 19/38* | (2006.01) |
| *C09K 19/54* | (2006.01) |

(52) U.S. Cl.
USPC ..... 428/195.1; 428/199; 283/72; 252/299.01; 252/299.5; 349/175; 427/7

(58) Field of Classification Search ............... 428/195.1, 428/199; 252/299.01, 299.5; 283/74, 72; 235/454, 462.01; 347/110; 349/175; 427/7
See application file for complete search history.

(56) References Cited

U.S. PATENT DOCUMENTS

| | | | |
|---|---|---|---|
| 6,207,240 B1 | 3/2001 | Schoenfeld et al. | |
| 7,540,421 B2 | 6/2009 | Pinchen et al. | |
| 8,142,682 B2* | 3/2012 | Kasch et al. ............ | 252/299.01 |
| 2003/0052305 A1 | 3/2003 | Coates et al. | |

(Continued)

FOREIGN PATENT DOCUMENTS

| | | |
|---|---|---|
| GB | 2457911 A | 9/2009 |
| JP | 2009-300662 A | 12/2009 |

(Continued)

OTHER PUBLICATIONS

M. Barón, *Pure Appl. Chem.*, 2001, vol. 73, No. 5, pp. 845-895.
English language translation of JP 2009-300662.

*Primary Examiner* — Shean C Wu
(74) *Attorney, Agent, or Firm* — Greenblum & Bernstein, P.L.C.

(57) ABSTRACT

A liquid crystal polymer marking is obtainable by a process that comprises applying a first chiral liquid crystal precursor composition onto a substrate, heating the composition to bring same to a first chiral liquid crystal state, applying to at least one area of the first composition a second chiral liquid crystal precursor composition, heating the at least one area to bring same to a second chiral liquid crystal state, and subsequently curing and/or polymerizing the resultant product. This abstract is neither intended to define the invention disclosed in this specification nor intended to limit the scope of the invention in any way.

35 Claims, 2 Drawing Sheets

U.S. PATENT DOCUMENTS

| | | |
|---|---|---|
| 2006/0257633 A1 | 11/2006 | Inoue et al. |
| 2007/0200001 A1 | 8/2007 | Pinchen et al. |
| 2007/0224341 A1 | 9/2007 | Kuntz et al. |
| 2009/0174914 A1 | 7/2009 | Pinchen et al. |
| 2010/0178508 A1* | 7/2010 | Kasch et al. .................. 428/402 |
| 2011/0133445 A1* | 6/2011 | Tiller et al. ..................... 283/74 |
| 2011/0135853 A1* | 6/2011 | Tiller et al. ..................... 428/29 |

FOREIGN PATENT DOCUMENTS

| | | |
|---|---|---|
| WO | 2005/049703 A | 6/2005 |
| WO | 2006/118889 A | 11/2006 |
| WO | 2009/121605 A | 10/2009 |

* cited by examiner

CHIRAL LIQUID CRYSTAL POLYMER MARKING

CROSS-REFERENCE TO RELATED APPLICATIONS

The present application claims the benefit under 35 U.S.C. §119(e) of U.S. Provisional Application No. 61/267,668, filed Dec. 8, 2009, the entire disclosure of which is expressly incorporated by reference herein.

BACKGROUND OF THE INVENTION

1. Field of the Invention

The present invention relates to a marking based on chiral nematic (also called cholesteric) liquid crystal polymers. The invention also relates to a method for the modification of chiral nematic liquid-crystal films, in which a chiral nematic liquid-crystal layer is locally or selectively (one or more region(s)) modified with the aid of a modifying agent.

2. Discussion of Background Information

Counterfeiting and market diversion of mass produced goods are facilitated if the products are handled on a lot base rather than on an individual item base. In such case counterfeit or diverted products are easily introduced into the supply chain. Producers and retailers would like to be in a position to distinguish their original products from such counterfeit or diverted (parallel imported or smuggled) products at the level of the individual unit that is sold.

In an attempt to prevent counterfeiting marking is currently used extensively; for example, "optically variable" features which exhibits viewing-angle dependent color, have been proposed in the art as authentication means. Among these are holograms (cf. Rudolf L. van Renesse, "Optical Document Security" 2nd ed., 1998, the entire disclosure whereof is incorporated by reference herein, chapter 10) and optical thin film security devices (idem, chapter 13).

Another type of marking in an attempt to prevent counterfeiting is a cholesteric liquid crystal, which exhibits viewing-angle dependent color. When illuminated with white light the cholesteric liquid crystal structure reflects light of a predetermined color (predetermined wavelength range) which is a function of the employed materials and generally varies with the angle of observation and the device temperature. The precursor material itself is colorless and the observed color (predetermined wavelength range) is only due to a physical reflection effect at the cholesteric helical structure adopted at a given temperature by the liquid crystal material (cf. J. L. Fergason, Molecular Crystals, Vol. 1, pp. 293-307 (1966), the entire disclosure whereof is incorporated by reference herein). In particular, in liquid crystal materials (cholesteric liquid crystal polymers (CLCPs)) the cholesteric helical structure is "frozen" in a predetermined state through polymerization and thus rendered temperature-independent.

The chiral nematic liquid crystal phase is typically composed of nematic mesogenic molecules which comprise a chiral dopant that produces intermolecular forces that favor alignment between molecules at a slight angle to one another. The result thereof is the formation of a structure which can be visualized as a stack of very thin 2-D nematic-like layers with the director in each layer twisted with respect to those above and below. An important characteristic of the chiral nematic liquid crystal phase is the pitch p (see FIG. 1). The pitch p is defined as the (vertical) distance it takes for the director to rotate one full turn in the helix.

A characteristic property of the helical structure of the chiral nematic phase is its ability to selectively reflect light whose wavelength falls within a specific range. When this range overlaps with a portion of the visible spectrum a colored reflection will be perceived by an observer. The center of the range is approximately equal to the pitch multiplied by the average refractive index of the material. One parameter which has an influence on the pitch is the temperature because of the dependence thereon of the gradual change in director orientation between successive layers which modifies the pitch length, resulting in an alteration of the wavelength of reflected light as a function of the temperature. The angle at which the director changes can be made larger, thereby tightening the pitch, by increasing the temperature of the molecules, hence giving them more thermal energy. Similarly, decreasing the temperature of the molecules increases the pitch length of the chiral nematic liquid crystal. Other definitions of liquid crystal polymers and liquid crystal phases can be found in M. Barón, *Pure Appl. Chem.*, 2001, Vol. 73, No. 5, pp. 845-895, the entire disclosure of which is incorporated by reference herein.

In order to enhance the level of security of a chiral liquid crystal polymer film a first idea which could come to mind is to superpose a code in the form of a pattern, indicia or a bar code on the liquid crystal polymer film. However, there is always a risk that a counterfeiter tampers with the code and manually applies it onto the liquid crystal polymer film.

A second possibility to overcome this problem is to insert directly the code inside the liquid crystal polymer film. For example, U.S. Pat. No. 6,207,240, the entire disclosure whereof is incorporated by reference herein, describes an effect coating of a cholesteric liquid crystal polymer (CLCP) with viewing angle dependent reflection color, which further comprises absorption type pigments exhibiting a specific absorption color. A marking, such as a symbol or a text, is generated in the CLCP coating by laser irradiation. The laser radiation carbonizes the CLCP material in the irradiated area. As a result, the color of the substrate on which the CLCP is coated, or the color of absorption pigments incorporated into the CLCP, becomes visible in the irradiated area. However, the method requires high-power lasers to carbonize the material such that the markings are visible.

Another possibility is described in US 2006/0257633A1, the entire disclosure of which is incorporated by reference herein, which is applied not only to liquid crystal polymers but to polymers in general. The method consists of applying a permeating substance to a predetermined region on the surface of the polymer substrate and bringing a supercritical fluid into contact with the surface of the polymer substrate to which the permeating substance has been applied to cause the permeating substance to permeate into the polymer substrate. The method makes it possible to selectively (partially) modify a portion of the surface of the polymer. However, for industrial processes where a high marking speed for a large number of items is required the method is complex and expensive to implement.

SUMMARY OF THE INVENTION

The present invention provides a liquid crystal polymer marking. The marking is obtainable by a process which comprises, in the following order:

(i) applying a first chiral liquid crystal precursor composition onto at least one surface of a (solid) substrate;
(ii) heating the applied first composition to bring same to a first chiral liquid crystal state;
(iii) applying to one or more areas (regions) of the applied first composition a (at least one) second chiral liquid crystal precursor composition;

(iv) heating at least one of the one or more areas to bring same to a second chiral liquid crystal state; and
(v) at least one of curing and polymerizing the applied first and second compositions.

In one aspect, one or both (preferably both) of the first and second chiral liquid crystal precursor compositions (and in particular, at least the first composition) may comprise (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH—C(O)—$.

In another aspect of the marking of the present invention, at least one (and preferably both) of the first and second chiral liquid crystal precursor compositions (and in particular, the first composition) may comprise at least one chiral dopant compound B of formula (I):

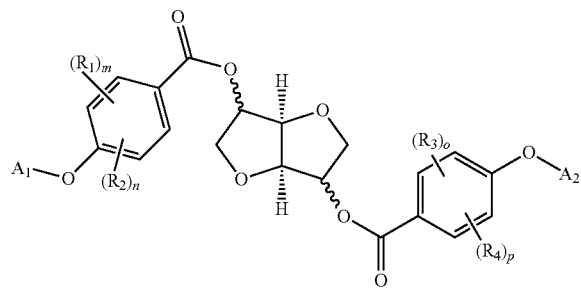

(I)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (iii):
 (i) $—[(CH_2)y-O]_z—C(O)—CH=CH_2$;
 (ii) $—C(O)-D_1-O—[(CH_2)_y—O]_z—C(O)—CH=CH_2$;
 (iii) $—C(O)-D_2-O—[(CH_2)_y—O]_z—C(O)—CH=CH_2$;
$D_1$ denotes a group of formula

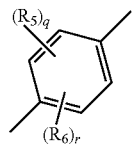

$D_2$ denotes a group of formula

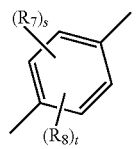

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In yet another aspect of the marking of the present invention, the first chiral liquid crystal precursor composition and the second chiral liquid crystal precursor composition may be identical. Alternatively, the first and second chiral liquid crystal precursor compositions may be different from each other. For example, the second chiral liquid crystal precursor composition may differ from the first chiral liquid crystal precursor composition at least in that the second composition comprises at least one of the one or more chiral dopant compounds B in a concentration which is different from a concentration of the same chiral dopant compound in the first composition and/or at least in that the second composition comprises at least one chiral dopant compound B which is different from any of the one of the one or more chiral dopant compounds B that are present in the first composition.

In a still further aspect of the instant marking, the second chiral liquid crystal precursor composition may further comprise at least one pigment and/or dye that absorbs in the visible or invisible region of the electromagnetic spectrum and/or may further comprise at least one luminescent pigment and/or dye.

In another aspect of the marking of the present invention, stage (ii) of the process may comprise a heating of the applied composition to a temperature of from about 55° C. to about 150° C., e.g., from about 55° C. to about 100° C., or from about 60° C. to about 100° C. and/or stage (iv) of the process may comprise a heating of the at least one of the one or more areas to a temperature of from about 55° C. to about 150° C., e.g., from about 55° C. to about 100° C., or from about 60° C. to about 100° C.

In a still further aspect, stage (i) and/or stage (iii) of the process may comprise an application (e.g., deposition) of the first or second chiral liquid crystal precursor composition by continuous ink jet printing and/or drop-on-demand ink-jet printing and/or spray coating and/or valve-jet printing.

In another aspect, immediately after stage (iii) of the process a stream of air may be passed over the surface of the one or more areas, preferably (substantially) parallel thereto.

In yet another aspect, the marking of the present invention may be in the form of at least one of an image, a picture, a logo, indicia, or a pattern representing a code selected from one or more of 1-dimensional barcodes, stacked 1-dimensional barcodes, 2-dimensional barcodes, 3-dimensional barcodes, and a data matrix.

The present invention also provides a substrate which comprises (e.g., carries on a surface thereof) the marking of the present invention as set forth above, including the various aspects thereof.

In one aspect of the substrate, the marking may serve as at least one of a security element, an authenticity element, an identification element, and a tracking and tracing element.

In another aspect, the substrate may be, or comprise, at least one of an identity document, a label, packaging, a banknote, a security document, a passport, a stamp, an ink-transfer film, and a reflective film.

The present invention also provides a security ink that comprises (i) one or more nematic compounds A and (ii) one or more chiral dopant compounds B which are capable of giving rise to a cholesteric state of the security ink upon application of heat thereto.

In one aspect, the security ink may comprise at least one chiral dopant compound B of formula (I) as set forth above.

The present invention also provides a method of providing a substrate with a liquid crystal polymer marking. The method comprises, in the following order:
(i) applying a first chiral liquid crystal precursor composition onto at least one surface of a (solid) substrate;

(ii) heating the applied first composition to bring same to a first chiral liquid crystal state;
(iii) applying to one or more areas (regions) of the applied first composition a (at least one) second chiral liquid crystal precursor composition;
(iv) heating at least one of the one or more areas to bring it to a second chiral liquid crystal state; and
(v) at least one of curing and polymerizing the applied first and second compositions.

The present invention also provides a substrate which comprises a marking (e.g., on at least one (outer) surface thereof). The marking comprises a layer or film of a first chiral liquid crystal polymer that has a first optical property. The layer or film comprises in at least one area (region) thereof a second liquid crystal polymer that has at least one second optical property which is different from the first optical property.

BRIEF DESCRIPTION OF THE DRAWINGS

The present invention is further described in the detailed description which follows, in reference to the plurality of drawings by way of non-limiting examples of exemplary embodiments of the present invention, and wherein.

DETAILED DESCRIPTION OF THE PRESENT INVENTION

Figure 1:
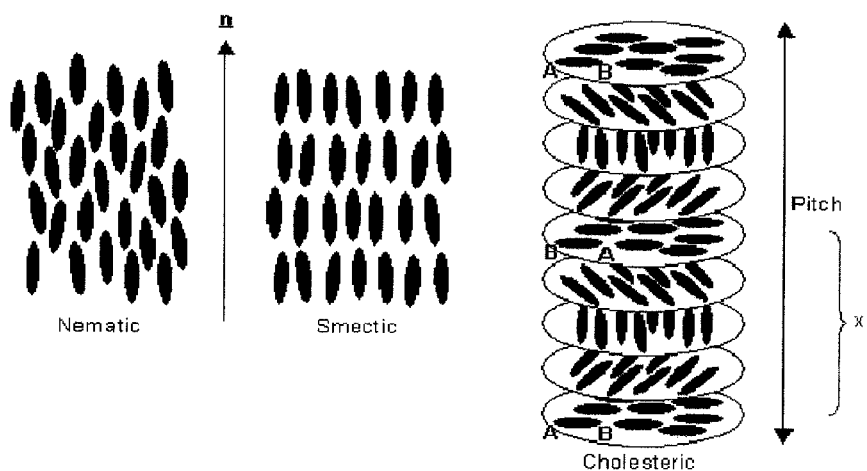
FIG. 1 is a schematic drawing which illustrates nematic, smectic and cholesteric liquid crystals.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The substrate for use in the present invention is not particularly limited and can be of various types. The substrate may, for example, consist (essentially) of or comprise one or more of a metal (for example, in the form of a container such as a can for holding various items such as, e.g., beverages or foodstuffs), optical fibers, a woven, a coating, and equivalents thereof, a plastic material, glass (for example, in the form of a container such as a bottle for holding various items such as, e.g., beverages or foodstuffs), cardboard, packaging, paper, and a polymeric material. It is pointed out that these substrate materials are given exclusively for exemplifying purposes, without restricting the scope of the invention. The substrate will preferably have a limited porosity (and may, for example, be substantially non-porous).

The substrate further will advantageously have a dark or black surface or background onto which the precursor composition is to be applied. Without wishing to be bound by any theory, it is speculated that in the case of a dark or black background the light transmitted by the cholesteric liquid crystal material is largely absorbed by the background, whereby any residual backscattering from the background does not disturb the perception of the cholesteric liquid crystal material's own reflection with the unaided eye. In contrast, on a substrate with a light or white surface or background the reflection color of the cholesteric liquid crystal material is less visible when compared with a black or dark background, due to the strong backscattering from the background. However, even in the case of a light or white background a cholesteric liquid crystal material can always be identified with the help of a circular polarization filter because it selectively reflects only one of the two possible circular polarized light components, in accordance with its chiral helical structure.

Non-limiting examples of suitable substrates include: cardboard darkened with black gravure ink (no overprinted varnish); cardboard darkened with black offset ink (no overprinted varnish); cardboard darkened with any black ink and overprinted with water based varnish; cardboard darkened with any black ink and overprinted with solvent varnish; metal treated with black coating. In general, any (preferably non-porous and preferably black) substrate (which may not necessarily be flat and may be uneven) whose coating is not soluble, or only slightly soluble, in the solvent(s) used in the chiral liquid precursor composition and in the modifying agent is a suitable substrate for the purposes of the present invention.

The first chiral liquid crystal precursor composition that is used for making the marking according to the present invention and is applied (e.g., deposited) onto at least a part of at least one surface of the substrate comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about five to about twenty times the (total) concentration of the one or more cholesteric compounds B. Generally, a precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the first and second chiral liquid crystal precursor compositions employed according to the present invention are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formula (I) to (iii) which are indicated above as meanings for $A_1$ and $A_2$ in formula (I) (and formulae (IA) and (IB)), typically bonded to optionally substituted phenyl groups. Specific non-limiting examples of nematic compounds which are suitable for use in the present invention are given below in the Example.

It is preferred for the one or more nematic compounds A (and also the one or more chiral dopant compounds B) for use in the present invention to be substantially free of compounds which do not comprise any polymerizable group (i.e., to preferably comprise compounds without any polymerizable group merely as impurities, if at all). It also is preferred for the nematic compounds to be different from cellulose derivatives.

The one or more cholesteric (i.e., chiral dopant) compounds B for use in the present invention preferably comprise at least one polymerizable group.

As set forth above, suitable examples of the one or more chiral dopant compounds B include those of formula (I):

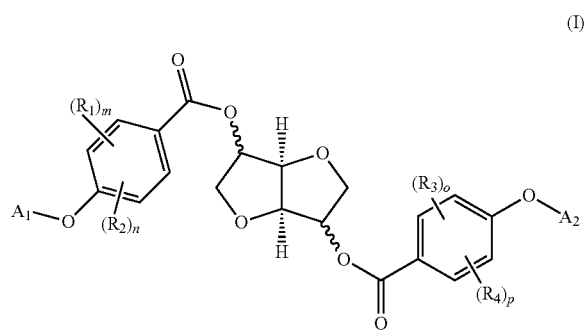

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (I) to (iii):
(i) —[(CH$_2$)y-O]$_z$—C(O)—CH=CH$_2$;
(ii) —C(O)-D$_1$-O—[(CH$_2$)$_y$—O]$_z$—C(O)—CH=CH$_2$;
(iii) —C(O)-D$_2$-O—[(CH$_2$)$_y$—O]$_z$—C(O)—CH=CH$_2$;
D$_1$ denotes a group of formula

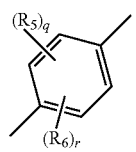

D$_2$ denotes a group of formula

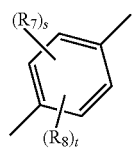

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one aspect, the one or more chiral dopant compounds B may comprise one or more isomannide derivatives of formula (IA):

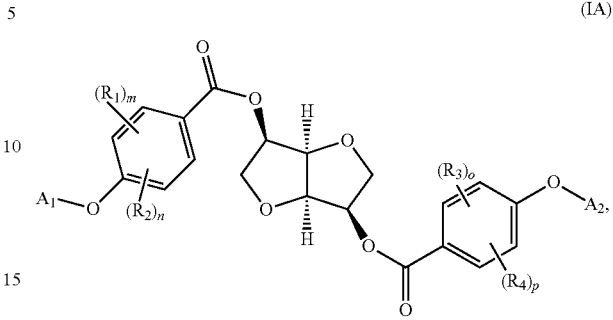

(IA)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):
(i) —[(CH$_2$)y-O]z-C(O)—CH=CH$_2$;
(ii) —C(O)-D$_1$-O—[(CH$_2$)y-O]z-C(O)—CH=CH$_2$;
(iii) —C(O)-D$_2$-O—[(CH$_2$)y-O]z-C(O)—CH=CH$_2$;
D$_1$ denotes a group of formula

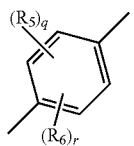

D$_2$ denotes a group of formula

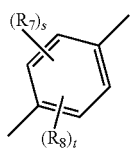

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-$D_1$-O—[(CH$_2$)$_y$—O]$_z$—C(O)—CH═CH$_2$ and/or a group of formula —C(O)-$D_2$-O—[(CH$_2$)$_y$—O]$_z$—C(O)—CH═CH$_2$; and $R_1$, $R_2$, $R_3$, $R_4$, $R_5$, $R_6$, $R_7$ and $R_8$ each independently denote $C_1$-$C_6$ alkoxy.

In another aspect, the one or more chiral dopant compounds B may comprise one or more isosorbide derivatives represented by formula (IB):

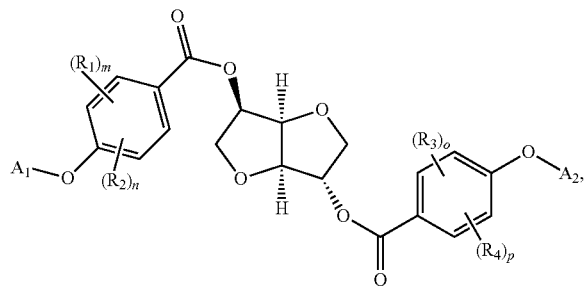

(IB)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):
(i) —[(CH$_2$)y—O]z-C(O)—CH═CH$_2$;
(ii) —C(O)-$D_1$-O—[(CH$_2$)y-O]z-C(O)—CH═CH$_2$;
(iii) —C(O)-$D_2$-O—[(CH$_2$)y—O]z-C(O)—CH═CH$_2$;
$D_1$ denotes a group of formula

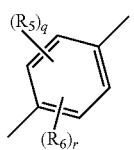

$D_2$ denotes a group of formula

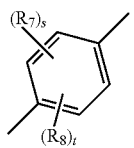

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IB) each independently denote $C_1$-$C_6$ alkoxy.

In another embodiment of the compounds of formula (IB), $A_1$ and $A_2$ each independently denote a group of formula —[(CH$_2$)$_y$—O]$_z$—C(O)—CH═CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula —[(CH$_2$)$_y$—O]$_z$—C(O)—CH═CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —C(O)-$D_1$-O—[(CH$_2$)$_y$—O]$_z$—C(O)—CH═CH$_2$ and/or of formula —C(O)-$D_2$-O—[(CH$_2$)$_y$—O]$_z$—C(O)—CH═CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IB) each independently denote a group of formula —C(O)-$D_1$-O—[(CH$_2$)$_y$—O]$_z$—C(O)—CH═CH$_2$ and/or a group of formula —C(O)-$D_2$-O—[(CH$_2$)$_y$—O]$_z$—C(O)—CH═CH$_2$; and $R_1$, $R_2$, $R_3$, $R_4$, $R_5$, $R_6$, $R_7$ and $R_8$ each independently denote $C_1$-$C_6$ alkoxy.

In a preferred embodiment, the alkyl and alkoxy groups of $R_1$, $R_2$, $R_3$, $R_4$, $R_5$, $R_6$, $R_7$ and $R_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) for use in the present invention are provided in the Example below.

The one or more chiral dopant compounds B will usually be present in a total concentration of from about 0.1% to about 30% by weight, e.g., from about 0.1% to about 25%, or from about 0.1% to about 20% by weight, based on the total weight of the composition. The best results will often be obtained with concentrations of from 3% to 10% by weight, e.g., from 5% to 8% by weight, based on the total weight of the precursor composition. The one or more nematic compounds A will often be present in a concentration of from about 30% to about 50% by weight, based on the total weight of the precursor composition.

In the marking according to the present invention the application (e.g., deposition) of the first precursor composition (and preferably also the second precursor composition) is preferably carried out with a printing technique, and in particular, a printing technique selected from at least one of continuous ink-jet printing, drop-on-demand ink-jet printing, and spray coating. Of course, other printing techniques known by those skilled in the art of printing may be used as well. In a preferred embodiment ink jet printing is employed. The industrial ink jet printers, commonly used for numbering, coding and marking applications on conditioning lines and printing presses, are particularly suitable. Preferred ink-jet printers include single nozzle continuous ink-jet printers (also called raster or multi level deflected printers) and drop-on-demand ink-jet printers, in particular valve-jet printers. The thickness of the applied precursor composition (and in particular, the first precursor composition) will usually be from about 3 to about 20 μm, e.g., from about 5 to about 15 μm.

In particular if the precursor composition is to be applied by the printing techniques set forth above, for example, by ink-jet printing, the composition will usually comprise a solvent to adjust its viscosity to a value which is suitable for the employed application (printing) technique. Typical viscosity values for ink-jet printing inks are in the range of from about 4 to about 30 mPa·s at 25° C. Suitable solvents are known to those of skill in the art. Non-limiting examples thereof include low-viscosity, slightly polar and aprotic organic solvents, such as, e.g., methyl ethyl ketone (MEK), acetone, ethyl acetate, ethyl 3-ethoxypropionate, toluene and mixtures of two or more thereof.

Further, in particular if the precursor composition is to be applied by continuous ink jet printing, the precursor composition for use in the present invention will usually also comprise at least one conductivity agent (for example, a salt). The conductivity agent will have a non-negligible solubility in the composition. Non-limiting examples of suitable conductivity agents include salts such as, e.g., tetraalkyl ammonium salts (e.g., tetrabutyl ammonium nitrate, tetrabutyl ammonium perchlorate and tetrabutyl ammonium hexafluorophosphate), alkali metal thiocyanates such as potassium thiocyanate and alkali metal perchlorates such as lithium perchlorate. The conductivity agent will be present in a concentration which is sufficient to provide the conductivity which is required or desirable. Of course, mixtures of two or more different conductivity agents (salts) can be used.

If the chiral liquid crystal precursor composition for use in the present invention is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If the precursor composition is to be cured by a method which is different from irradiation with UV light such as, e.g., by means of high-energy particles (e.g., electron beams), X-rays, gamma-rays, etc. the use of a photoinitiator can, of course, be dispensed with.

The chiral liquid crystal precursor compositions for use in the present invention may also comprise a variety of other optional components which are suitable and/or desirable for achieving a particular desired property of the composition and in general, may comprise any components/substances which do not adversely affect a required property of the precursor composition to any significant extent. Non-limiting examples of such optional components are resins, silane compounds, sensitizers for the photoinitiators (if present), etc. For example, the composition may comprise one or more silane compounds which show a non-negligible solubility in the composition. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy$(C_{1-6})$alkyl such as, e.g., vinyltriethoxysilane, vinyltrimethoxysilane, vinyltris(2-methoxyethoxy)silane, 3-methacryloxypropyl-trimethoxysilane, octyltri-ethoxysilane, and 3-glycidyloxypropyl triethoxysilane from Dynasylan® family supplied by Evonik.

The concentration of the one or more silane compounds, if present, in a precursor composition will usually be from about 0.5% to about 5% by weight, based on the total weight of the composition.

Following the application (e.g., deposition) of the first chiral liquid crystal precursor composition according to the invention onto the substrate the precursor composition is brought to a chiral liquid crystal state having specific optical properties. To that end the first chiral liquid crystal precursor composition is heated, the solvent contained in the composition, if present, is evaporated and the promotion of the desired first chiral liquid crystal state takes place. The temperature used to evaporate the solvent and to promote the formation of the first liquid crystal state depends on the components of the first chiral liquid crystal precursor composition and will in many cases range from about 55° C. to about 150° C., e.g., from about 55° C. to about 100° C., preferably from about 60° C. to about 100° C. Examples of suitable heating sources include conventional heating means and in particular, radiation sources such as, e.g., an IR lamp. In many cases a heating time of from about 1 second to about 30 seconds such as, e.g., not more than about 20 seconds, not more than about 10 seconds, or not more than about 5 seconds will be sufficient.

The term "specific optical properties" is to be understood as a liquid crystal state with a specific pitch that reflects a specific wavelength range. An advantage of a precursor composition which contains a chiral dopant according to formula (I) and related formulae is the ability to generate a stable liquid crystal state quickly after the heating (and evaporation of the solvent). In contrast, the liquid crystal states which are obtained after heating and evaporation of the solvent with precursor compositions of the prior art (see, e.g., EP 1 299 375, EP 1 669 431, and EP 1 339 812, the entire disclosures of which are incorporated by reference herein) very often can easily be disrupted by minor temperature changes. Therefore, to maintain the stability of the liquid crystal state it is necessary in the latter case to freeze or fix the liquid crystal state by means of an at least partial curing or polymerization process. As previously mentioned, when the liquid crystal state is frozen or fixed the creation of a code or a marking inside the marking becomes harder. In contrast, in the process for making a marking according to the present invention no curing/polymerization of components of the precursor compositions is carried out prior to stage (v). In other words, a curing/polymerization process is carried out only after the first and second chiral liquid crystal states have been achieved.

Following the application of the first chiral liquid crystal precursor composition and the formation of a first chiral liquid crystal state (which can be in the form of, e.g., a layer, a pattern or a film) a (at least one) second chiral liquid crystal precursor composition is applied onto one or more regions of the applied first composition in the first chiral liquid crystal state. The second chiral liquid crystal precursor composition may be applied while the first chiral liquid crystal precursor composition is still in a heated state (e.g., immediately following the completion of the heating operation) or may be applied after the first chiral liquid crystal precursor composition has cooled down to at least some extent (e.g., is at substantially room temperature). If desired, the cooling of the first precursor composition can be accelerated by means known to those of skill in the art such as, e.g., by blowing ambient air onto the previously heated composition. Applying the second chiral liquid crystal precursor composition to the first precursor composition in a cooled-down state may improve the resolution of the marking. On the other hand, applying the second chiral liquid crystal precursor composition immediately after completion of the heating operation may be desirable if the entire process of making the marking is to be conducted in an as simple and speedy as possible manner.

The second chiral liquid crystal precursor composition which is applied in one or more areas on the first chiral liquid precursor composition in the first chiral liquid crystal state may be the same as or different from the first chiral liquid crystal precursor composition. Further, everything that is set forth above with respect to the first chiral liquid precursor composition (e.g., components, application methods, etc.) applies equally and without exception also to the second chiral liquid precursor composition. For example, as in the case of the first chiral liquid crystal precursor composition the one or more chiral dopant compounds B will usually be present in the second chiral liquid crystal precursor composition in a total concentration of from about 0.1% to about 30% by weight, e.g., from about 0.1% to about 25%, or from about 0.1% to about 20% by weight, based on the total weight of the second composition. Also, the one or more nematic compounds A will often be present in the second chiral liquid crystal precursor composition in a concentration of from about 30% to about 50% by weight, based on the total weight of the second precursor composition.

If the second chiral liquid crystal precursor composition is different from the first chiral liquid crystal precursor composition the one or more differences may relate to, e.g., one or more of the compounds A and B that are present in these compositions and/or to the concentrations of one or more of these compounds. For example, a or the only difference between these compositions may be that one or more (or all) of the chiral dopant compounds B are present in the second composition in a concentration/concentrations that is/are different from the corresponding concentration/concentrations in the first composition. Further, a or the only difference between the first and second compositions may be that the one or more chiral dopant compounds B in the first composition are of formula (I) above and/or related formulae and at least one of the one or more chiral dopant compounds B in the second composition is different from formula (I) and/or related formulae. For example, at least one of the one or more chiral dopant compounds B in the second composition may be an isosorbide or isomannide derivative as described in, e.g., EP-B-0 847 432, GB-A-2 330 139, and U.S. Pat. No. 6,589,445, the entire disclosures of which are incorporated by reference herein.

After the application (e.g. deposition) of the second chiral liquid crystal precursor composition to one or more areas of the first chiral liquid crystal precursor composition in the first chiral liquid crystal state having first specific optical properties, the second precursor composition is brought to a second chiral liquid crystal state having second specific optical properties. To that end at least a part of the one or more areas onto which the second chiral liquid crystal precursor composition has been applied is heated, the solvent contained in the composition, if present, is evaporated and the promotion of the desired second chiral liquid crystal state takes place. The temperature used to evaporate the solvent and to promote the formation of the second liquid crystal state depends on the components of the second chiral liquid crystal precursor composition and will in many cases range from about 55° C. to about 150° C., e.g., from about 55° C. to about 100° C., preferably from about 60° C. to about 100° C. Examples of suitable heating sources include conventional heating means and in particular, radiation sources such as, e.g., an IR lamp.

It is to be appreciated that the marking according to the present invention is not identical or comparable to a simple superposition of two chiral nematic liquid crystal layers. This constitutes a significant difference and a great advantage over the existing prior art. In particular, when the first chiral liquid crystal precursor composition is deposited on a substrate and brought to the first chiral liquid crystal state this state is characterized by a pitch p1. Likewise, when the second chiral liquid crystal precursor composition is deposited on one or more areas of the applied first composition and brought to the second chiral liquid crystal state the second state is characterized by a pitch p2 (which may be the same or different from p1). In this regard, it is pointed out that the product that is obtained after stage (iv) and further cured/polymerized in stage (v) of the process of the present invention is not a superposition of a first chiral liquid crystal state having a pitch p1 and a second chiral liquid crystal state having a pitch p2. Rather, an area carrying the second chiral liquid crystal precursor composition, once brought to the second chiral liquid crystal state, has a pitch p2' which is different from p1 and p2 but it is somewhat dependent on the nature of p1. Without wishing to be bound by any theory it is speculated that the first chiral liquid crystal state has an impact on the formation of the second chiral liquid crystal state. The induction of the first chiral liquid crystal state on the second chiral liquid crystal precursor composition will accelerate and promote a second chiral liquid crystal state which is different from the chiral liquid crystal state that would be expected based solely on the second chiral liquid crystal precursor composition alone. This constitutes a significant difference and a great advantage over the existing prior art which discloses the mere superposition of two different layers of two different chiral liquid crystal states as a marking or coding.

The marking according to the present invention is controlled by the first chiral liquid crystal precursor composition which is only known by the producer of the marking. From different first chiral liquid crystal precursor compositions a large number of specific markings and codings can be generated and stored in a specific database which contains all of the markings or codings produced. Without wishing to be bound by any theory it is speculated that the second precursor composition will initiate a very local and controlled reorganization of the first chiral liquid crystal state. It further is to be noted that the method of the present invention is fast and easy to implement industrially, and does not require complex means.

The area of the applied first precursor composition onto which the second precursor composition is applied will usually be from about 0.1% to about 99.9% of the total area of the applied first precursor composition. The area will often be at least about 1%, e.g., at least about 5% or at least about 10% and not higher than about 99%, e.g., not higher than about 95% or not higher than about 90% of the total area of the applied first precursor composition.

Figure 2:
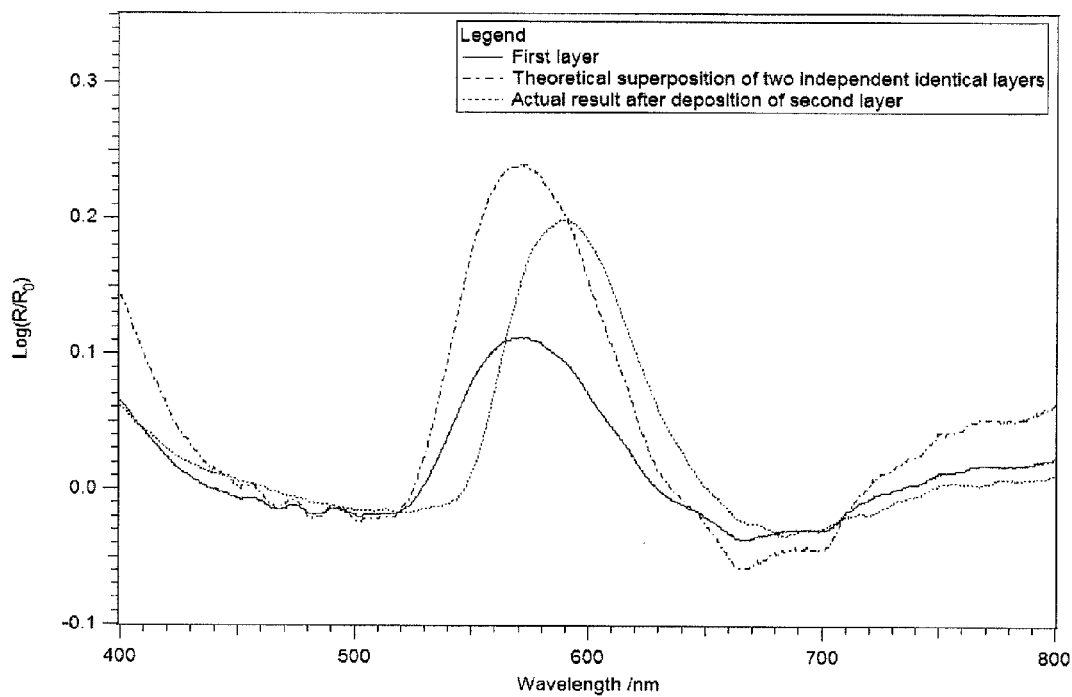
FIG. 2 is a graph which illustrates the spectral reflectance of a first chiral liquid crystal polymer, a second chiral liquid crystal polymer and of both polymers together.

The marking according to the present invention may be in the form of an image, a picture, a logo, indicia, and/or a pattern representing a (1D, 2D, 3D) code such as, e.g., a 1-dimensional barcode, a stacked 1-dimensional barcode, a 2-dimensional barcode, a 3-dimensional barcode and/or a data matrix. An example of a corresponding marking is represented by FIG. 2.

It is, of course, possible to use more than one second precursor composition (e.g., two, three or more different second precursor compositions) and to apply them simultaneously and/or successively onto the applied first precursor composition (e.g., in different regions of the applied first precursor composition). It also is possible, for example, to apply a second precursor composition and to thereafter apply a different second precursor composition in at least a part of the region(s) in which the initially applied second precursor composition has been applied (and, optionally, also in one or more regions where the initially applied second precursor composition has not been applied).

In order to strengthen the security of the marking according to the present invention the second chiral liquid crystal precursor composition may further comprise one or more pigments and/or dyes which absorb in the visible or invisible region of the electromagnetic spectrum and/or may further comprise one or more pigments and/or dyes which are luminescent. Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. The presence of pigment(s) and/or dye(s) will enhance and reinforce the security of the marking against counterfeiting. Of course, in addition to the components discussed above the second chiral liquid crystal precursor composition for use in the present invention may comprise any other components/substances which do not adversely affect the required properties of the second chiral liquid crystal precursor composition to any significant extent.

In the marking according to the present invention the deposition of the second precursor composition is performed onto one or more regions of the first chiral liquid crystal precursor composition in the first liquid crystal state preferably with a printing technique and in particular, a technique selected from continuous ink-jet printing, drop-on-demand ink-jet printing, valve-jet printing and spray coating. The advantage, in particular compared to the prior art using lasers or extracting agents on polymerized or partially polymerized liquid crystals is the speed and ease of the formation of the marking, which is generated in almost real time. Another advantage of using the above printing techniques is the precision and the stability of the marking created inside the chiral liquid crystal state. Another advantage of using this printing technique is the nearly unlimited possibilities of marking which can be created and varied in almost real time. In a preferred embodiment ink jet techniques are used for applying the second precursor composition. The industrial ink jet printers, commonly used for numbering and coding and marking applications on conditioning lines and printing presses, are particularly suitable. Preferred ink-jet printers are single nozzle continuous ink-jet printers (also called raster or multi level deflected printers) and drop-on-demand ink-jet printers, in particular valve-jet printers.

In order to enhance the resolution of the applied marking it will often be advantageous if immediately after the application of the second precursor composition to one or more regions of the applied first precursor composition a stream of air is passed over the surface of the first precursor composition, preferably (substantially) parallel thereto. The stream of air can be generated by any means, e.g., with an (industrial) air dryer. The stream of air will preferably not be intense and/or of high speed. The temperature of the air will usually be ambient (e.g., about 20° C.) but may also be somewhat lower or higher, e.g., up to about 60° C., up to about 40° C., or up to about 30° C. The phrase "immediately after the application of the second precursor composition" is intended to mean without delay, e.g., within a period of not more than about 10 seconds, for example, not more than about 5 seconds, not more than about 3 seconds, not more than about 2 seconds, or not more than about 1 second following the completion of the application of the second precursor composition.

The marking according to the present invention is finally obtained by curing and/or polymerizing the composition in the first chiral liquid crystal state that has been locally modified (in one or more region(s)) by the application of the second precursor composition in the second chiral liquid crystal state. The fixing or hardening is preferably performed by irradiation with UV-light, which induces polymerization of the polymerizable groups present in the precursor composition. Contrary to the prior art set forth above, the marking according to the invention is easy to implement industrially, and reliable.

FIG. 2 clearly demonstrates that the spectral reflectance of the cured product in the region(s) where the second chiral liquid crystal precursor composition has been applied is not the sum of the two spectral reflectances of the two chiral liquid crystal precursor compositions taken independently, even when the first and second precursor compositions are identical.

Another advantage of the marking according to the present invention is that the natural random variations inherently present in the printing process according to the present invention can be used as a unique identifier ("fingerprint") which is virtually impossible to reproduce. In this regard, it is to be appreciated that even without the application of a second precursor composition the cured and/or polymerized first precursor composition in the chiral liquid crystal state is a marking. In other words, the second precursor composition serves to generate a "marking within/on a marking".

The marking according to the present invention can be incorporated, for example, in a security feature, an authenticity feature, an identification feature or a tracking and tracing feature. An example of a security feature is an overt feature with a 3D effect.

The following examples are intended to illustrate the invention without restricting it.

EXAMPLE

A marking according to the present invention is prepared as follows:
(1) Preparation of the First Chiral Liquid Crystal Precursors Composition A chiral liquid crystal precursor composition (1) was prepared as follows:
A chiral dopant compound B of formula (I) shown above, i.e., (3R,3aR,6R,6aR)-hexahydrofuro[3,2-b]furan-3,6-diyl bis(4-(4-(acryloyloxy)-3-methoxybenzoyloxy)-3-methoxy-benzoate) (7.5 g), a nematic compound A1, i.e., benzoic acid, 4-[[[4-[(1-oxo-2-propen-1-yl)oxy]butoxy]carbonyl]oxy]-1, 1'-(2-methyl-1,4-phenylene) ester (22.0 g), a nematic compound A2, i.e., 2-methyl-1,4-phenylene bis(4-(4-(acryloyloxy)butoxy)-benzoate) (14.0 g), and acetone (49.9 g) were weighed into a screwable flask which was thereafter heated in an oven until obtaining a brownish solution. To the mixture were then added tetrabutylammonium perchlorate (0.6 g), lithium perchlorate (0.3 g), 2-methyl-1[4-(methylthio)phenyl]-2-morpholinopropan-1-one (Irgacure 907® from Ciba, 1.3 g), 2,4-diethyl-thioxanthen-9-one (0.7 g), and vinyltriethoxysilane (3.7 g). The final mixture was then stirred or shaken until complete dissolution was achieved to result in the chiral liquid crystal precursor composition (1).

A chiral liquid crystal precursor composition (2) was prepared as follows:

A chiral dopant compound B of formula (I) shown above, i.e., (3R,3aR,6R,6aR)-6-(4-(4-(acryloyloxy)-3-methoxybenzoyloxy)-3-methoxybenzoyloxy)hexahydrofuro[3,2-b]furan-3-yl 4-(4-(acryloyloxy)benzoyloxy)-3-methoxybenzoate (9.0 g), a nematic compound A1, i.e., benzoic acid, 4-[[[4-[(1-oxo-2-propen-1-yl)oxy]butoxy]carbonyl]oxy]-1,1'-(2-methyl-1,4-phenylene) ester (16.0 g), a nematic compound A2, i.e., 2-methyl-1,4-phenylene bis(4-(4-(acryloyloxy)butoxy)-benzoate) (20.0 g), and methyl ethyl ketone (48.0 g) were weighed into a screwable flask which was thereafter heated in an oven until obtaining a brownish solution. To the mixture were then added tetrabutylammonium perchlorate (0.5 g), lithium perchlorate (0.6 g), 2-methyl-1 [4-(methylthio)phenyl]-2-morpholinopropan-1-one (Irgacure 907® from Ciba, 1.2 g), 2-isopropyl-thioxanthen-9-one (0.7 g), and vinyltriethoxysilane (4.0 g). The final mixture was then stirred or shaken until complete dissolution was achieved to result in the chiral liquid crystal precursor composition (2).

(2) Deposition of the First Chiral Liquid Crystal Precursor Composition on a Substrate The chiral liquid crystal precursor composition (1) or (2) was then used to print a plain pattern by continuous ink-jet printing on a paper substrate with a dark background.

(3) Bringing the First Precursor Composition to the First Chiral Liquid Crystal State The chiral liquid crystal state was developed from the plain pattern by exposure to an IR lamp for about 1 to 5 seconds (depending on the substrate).

(4) Application of the Second Chiral Liquid Crystal Precursor Composition to One or More Regions of the Deposited First Composition A code or design was then printed on top of the deposited precursor composition in the first chiral liquid crystal state with a continuous ink-jet printer. Within about 1 second following the completion of the printing process an air flow was streamed parallel to the printed surface. The ink jet ink was identical with the precursor composition of step (1) (i.e., identical with chiral liquid crystal precursor composition (1) or identical with chiral liquid crystal precursor composition (2)).

(5) Bringing the Second Chiral Precursor Composition to the Second Chiral Liquid Crystal State Having Different Optical Properties from the First One The second chiral liquid crystal state in the regions with the code or design printed thereon was developed by exposure of the resulting product including the marking to an IR lamp for about 1 to 5 seconds (depending on the substrate). This resulted locally in a novel anisotropic state different from the first one.

(6) Curing or Polymerizing the Resulting Product

The resultant product with the marking printed thereon was then cured by a UV dryer with a mercury low-pressure lamp having a UV irradiance of 10 mW/cm$^2$.

Figure 3:
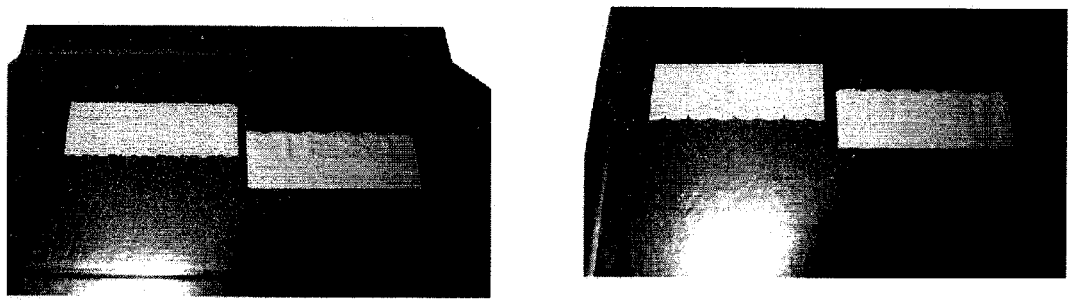
FIG. 3 shows photographs of a marking in accordance with the present invention viewed from two different angles.

An example of a product with marking obtained by the above procedure is shown in FIG. 3.

The following other compounds may, for example, be employed in the above-described procedure instead of the chiral dopant compound B of formula (I):

(3R,3aR,6R,6aR)-hexahydrofuro[3,2-b]furan-3,6-diyl bis(4-(4(acryloyloxy)benzoyloxy)-benzoate);

(3R,3aR,6R,6aR)-hexahydrofuro[3,2-b]furan-3,6-diyl bis(4-(4-(acryloyloxy)butoxy)-benzoate);

(3R,3aR,6R,6aR)-hexahydrofuro[3,2-b]furan-3,6-diyl bis(4-(acryloyloxy)-2-methyl-benzoate);

(3R,3aR,6S,6aR)-hexahydrofuro[3,2-b]furan-3,6-diyl bis(4-(4-(acryloyloxy)benzoyloxy)-3-methoxybenzoate);

(3R,3aR,6R,6aR)-hexahydrofuro[3,2-b]furan-3,6-diyl bis(4-(4-(acryloyloxy)-3-methoxy-benzoyloxy)benzoate);

(3R,3aR,6R,6aR)-hexahydrofuro[3,2-b]furan-3,6-diyl bis(4-(4(acryloyloxy)benzoyloxy)-3-methoxybenzoate);

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;

2,5-bis-O-(4-{[4-(acryloyloxy)benzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;

2,5-bis-O-(4-{[4-(acryloyloxy)benzoyl]oxy}-3-methoxybenzoyl)-1,4:3,6-dianhydro-D-mannitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;
2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;
2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;
2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;
2,5-bis-O-(4-{[4-(acryloyloxy)-2,5-dimethylbenzoyl]oxy}-2-ethoxybenzoyl)-1,4:3,6-dianhydro-D-mannitol;
2,5-bis-O-(4-{[4-(acryloyloxy)-2-ethoxybenzoyl]oxy}-2-ethoxybenzoyl)-1,4:3,6-dianhydro-D-mannitol;
2,5-bis-O-(4-{[4-(acryloyloxy)-2-methoxybenzoyl]oxy}-2-ethoxybenzoyl)-1,4:3,6-dianhydro-D-mannitol;
2,5-bis-O-(4-{[4-(acryloyloxy)-2-ethoxybenzoyl]oxy}-2-methoxybenzoyl)-1,4:3,6-dianhydro-D-mannitol;
2,5-bis-O-(4-{[4-(acryloyloxy)-2-ethoxybenzoyl]oxy}-3-methylbenzoyl)-1,4:3,6-dianhydro-D-mannitol;
2,5-bis-O-(4-{[4-(acryloyloxy)-2-ethoxybenzoyl]oxy}-3-methoxybenzoyl)-1,4:3,6-dianhydro-D-mannitol;
2,5-bis-O-(4-{[4-(acryloyloxy)-3-methoxybenzoyl]oxy}-3-methoxybenzoyl)-1,4:3,6-dianhydro-D-mannitol;
2,5-bis-O-(4-{[4-(acryloyloxy)-3-methoxybenzoyl]oxy}-3-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;
2,5-bis-O-(4-{[4-(acryloyloxy)benzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;
2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2,5-bis-O-(4-{[4-(acryloyloxy)benzoyl]oxy}-3-methoxybenzoyl)-1,4:3,6-dianhydro-D-glucitol;
2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;
2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;
2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;
2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;
2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;
2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;
2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;
2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol
2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol;
2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol
2,5-bis-O-(4-{[4-(acryloyloxy)-2,5-dimethylbenzoyl]oxy}-2-ethoxybenzoyl)-1,4:3,6-dianhydro-D-glucitol;
2,5-bis-O-(4-{[4-(acryloyloxy)-2-ethoxybenzoyl]oxy}-2-ethoxybenzoyl)-1,4:3,6-dianhydro-D-glucitol;
2,5-bis-O-(4-{[4-(acryloyloxy)-2-methoxybenzoyl]oxy}-2-ethoxybenzoyl)-1,4:3,6-dianhydro-D-glucitol;
2,5-bis-O-(4-{[4-(acryloyloxy)-2-ethoxybenzoyl]oxy}-2-methoxybenzoyl)-1,4:3,6-dianhydro-D-glucitol;
2,5-bis-O-(4-{[4-(acryloyloxy)-2-ethoxybenzoyl]oxy}-3-methylbenzoyl)-1,4:3,6-dianhydro-D-glucitol; and
2,5-bis-O-(4-{[4-(acryloyloxy)-2-ethoxybenzoyl]oxy}-3-methoxybenzoyl)-1,4:3,6-dianhydro-D-glucitol.

As nematic compound A1 in the above-described procedure the following other compounds may, for example, be employed:
2-methoxybenzene-1,4-diyl bis[4-({[4-(acryloyloxy)butoxy]carbonyl}oxy)benzoate];
4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;
2-methoxybenzene-1,4-diyl bis[4-([{4-(acryloyl oxy)butoxy]carbonyl}oxy)-2-methyl-benzoate];
2-methylbenzene-1,4-diyl bis[4-([{4-(acryloyloxy)butoxy]carbonyl}oxy)-2-methyl-benzoate];
4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;
2-methylbenzene-1,4-diyl bis[4-({[4-(acryloyloxy)butoxy]carbonyl}oxy)benzoate];
2-methylbenzene-1,4-diyl bis[4-({[4-(acryloyloxy)butoxy]carbonyl}oxy)-3-methoxy-benzoate];
4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;
2-methylbenzene-1,4-diyl bis[4-({[4-(acryloyloxy)butoxy]carbonyl}oxy)-3,5-dimethoxy-benzoate];
2-methoxybenzene-1,4-diyl bis[4-({[4-(acryloyloxy)butoxy]carbonyl}oxy)-3,5-di-methoxybenzoate]; and 4-{[4-({[4-(acryloyloxy)butoxy]carbonyl}oxy)-3-methoxybenzoyl]oxy}-2-methoxyphenyl 4-([{4-(acryloyloxy)butoxy]carbonyl}oxy)-3,5-dimethoxybenzoate.

As nematic compound A2 in the above-described procedure the following compounds may, for example, be employed:

4-({4-[4-(acryloyloxy)butoxy]benzoyl}oxy)-3-methylphenyl 4-[4-(acryloyloxy)butoxy]-2-methylbenzoate;
4-({4-[4-(acryloyloxy)butoxy]benzoyl}oxy)-3-methylphenyl 4-[4-(acryloyloxy)butoxy]-3-methylbenzoate;
2-methylbenzene-1,4-diyl bis{4-[4-(acryloyloxy)butoxy]-2-methylbenzoate};
4-({4-[4-(acryloyloxy)butoxy]-2-methylbenzoyl}oxy)-3-methylphenyl 4-[4-(acryloyl-oxy)butoxy]-2,5-dimethylbenzoate;
2-methylbenzene-1,4-diyl bis{4-[4-(acryloyloxy)butoxy]-2,5-dimethylbenzoate}
2-methylbenzene-1,4-diyl bis{4-[4-(acryloyloxy)butoxy]benzoate};
4-({4-[4-(acryloyloxy)butoxy]-3,5-dimethylbenzoyl}oxy)-3-methylphenyl 4-[4-(acryloyloxy)butoxy]-2,5-dimethylbenzoate;
2-methylbenzene-1,4-diyl bis{4-[4-(acryloyloxy)butoxy]-3,5-dimethylbenzoate};
2-methoxybenzene-1,4-diyl bis{4-[4-(acryloyloxy)butoxy]-3,5-dimethylbenzoate};
4-({4-[4-(acryloyloxy)butoxy]-3-methylbenzoyl}oxy)-2-methoxyphenyl 4-[4-(acryloyl-oxy)butoxy]-3,5-dimethylbenzoate;
2-methoxybenzene-1,4-diyl bis{4-[4-(acryloyloxy)butoxy]-3-methylbenzoate};
4-({4-[4-(acryloyloxy)butoxy]benzoyl}oxy)-3-methoxyphenyl 4-[4-(acryloyloxy)-butoxy]-3-methylbenzoate;
4-({4-[4-(acryloyloxy)butoxy]benzoyl}oxy)-3-methoxyphenyl 4-[4-(acryloyloxy)-butoxy]-2,5-dimethylbenzoate;
2-methoxybenzene-1,4-diyl bis{4-[4-(acryloyloxy)butoxy]-2-methoxybenzoate};
2-methoxybenzene-1,4-diyl bis{4-[4-(acryloyloxy)butoxy]-3,5-dimethoxybenzoate};
2-methoxybenzene-1,4-diyl bis{4-[4-(acryloyloxy)butoxy]-3-methoxybenzoate};
2-ethoxybenzene-1,4-diyl bis{4-[4-(acryloyloxy)butoxy]benzoate};
2-ethoxybenzene-1,4-diyl bis{4-[4-(acryloyloxy)butoxy]-2-methylbenzoate};
2-(propan-2-yloxy)benzene-1,4-diyl bis{4-[4-(acryloyloxy)butoxy]benzoate};
4-({4-[4-(acryloyloxy)butoxy]benzoyl}oxy)-2-(propan-2-yloxy)phenyl 4-[4-(acryloyl-oxy)butoxy]-2-methylbenzoate;
2-(propan-2-yloxy)benzene-1,4-diyl bis{4-[4-(acryloyloxy)butoxy]-2-methylbenzoate};
2-(propan-2-yloxy)benzene-1,4-diyl bis{4-[4-(acryloyloxy)butoxy]-2,5-dimethyl-benzoate};
2-(propan-2-yloxy)benzene-1,4-diyl bis{4-[4-(acryloyloxy)butoxy]-3,5-dimethyl-benzoate}; and
2-(propan-2-yloxy)benzene-1,4-diyl bis{4-[4-(acryloyloxy)butoxy]-3,5-dimethoxy-benzoate}.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The entire disclosures of concurrently filed U.S. patent applications entitled "MARKING BASED ON MODIFIED CHIRAL LIQUID CRYSTAL POLYMERS" application Ser. No. 12/783,068, "MARKING BASED ON MODIFIED CHIRAL LIQUID CRYSTAL POLYMERS" application Ser. No. 12/783,081, and "MODIFIED MARKING BASED ON CHIRAL LIQUID CRYSTAL POLYMERS" application Ser. No. 12/783,088 are expressly incorporated by reference herein.

What is claimed is:

1. A liquid crystal polymer marking, wherein the marking is obtained by a process comprising:
   (i) applying a first chiral liquid crystal precursor composition onto a substrate;
   (ii) heating the applied first chiral liquid crystal precursor composition to bring same to a first chiral liquid crystal state;
   (iii) applying to one or more areas of the applied first composition at a first chiral liquid crystal state a second chiral liquid crystal precursor composition, the one or more areas being less than a total surface area of the applied composition at a first chiral liquid crystal state;
   (iv) heating at least one of the one or more areas to bring same to a second chiral liquid crystal state forming a modified first chiral liquid crystal precursor in the at least one of the one or more areas; and
   (v) at least one of curing and polymerizing the applied first and second compositions.

2. The marking of claim 1, wherein at least one of the first and second chiral liquid crystal precursor compositions comprises (i) one or more nematic compounds A and (ii) one or more chiral dopant compounds B which are capable of giving rise to a cholesteric state of the chiral liquid crystal precursor composition.

3. The marking of claim 2, wherein the at least one of the first and second chiral liquid crystal precursor compositions comprises at least two compounds A.

4. The marking of claim 2, wherein the one or more nematic compounds A as well as the one or more chiral dopant compounds B comprise at least one compound that comprises at least one polymerizable group.

5. The marking of claim 4, wherein the at least one polymerizable group comprises an unsaturated carbon-carbon bond.

6. The marking of claim 5, wherein the at least one polymerizable group comprises a group of formula $H_2C=CH—C(O)—$.

7. The marking of claim 2, wherein all of the one or more nematic compounds A and all of the one or more chiral dopant compounds B comprise at least one polymerizable group.

8. The marking of claim 2, wherein the at least one of the first and second chiral liquid crystal precursor compositions comprises at least one chiral dopant compound B of formula (I):

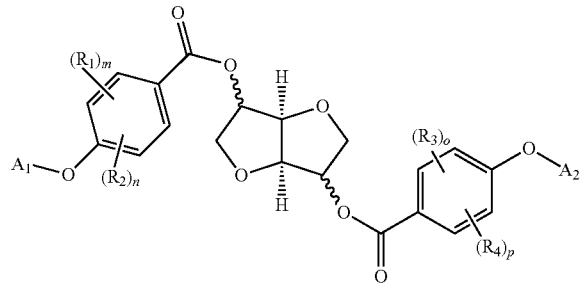

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (I) to (iii):
(i) —[(CH$_2$)$_y$—O]$_z$—C(O)—CH=CH$_2$;
(ii) —C(O)-D$_1$-O—[(CH$_2$)$_y$—O]$_z$—C(O)—CH=CH$_2$;
(iii) —C(O)-D$_2$-O—[(CH$_2$)$_y$—O]$_z$—C(O)—CH=CH$_2$;
$D_1$ denotes a group of formula

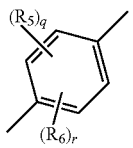

$D_2$ denotes a group of formula

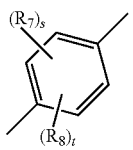

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

9. The marking of claim 1, wherein the first chiral liquid crystal precursor composition and the second chiral liquid crystal precursor composition are identical.

10. The marking of claim 1, wherein the second chiral liquid crystal precursor composition is different from the first chiral liquid crystal precursor composition.

11. The marking of claim 2, wherein the second chiral liquid crystal precursor composition differs from the first chiral liquid crystal precursor composition at least in that it comprises at least one of the one or more chiral dopant compounds B in a concentration which is different from a concentration of the same chiral dopant compound in the first chiral liquid crystal precursor composition.

12. The marking of claim 2, wherein the second chiral liquid crystal precursor composition differs from the first chiral liquid crystal precursor composition at least in that it comprises at least one chiral dopant compound B which is different from any of the one of the one or more chiral dopant compounds B that are present in the first composition.

13. The marking of claim 1, wherein the second chiral liquid crystal precursor composition further comprises at least one of a pigment and a dye that absorbs in the visible or invisible region of the electromagnetic spectrum.

14. The marking of claim 1, wherein the second chiral liquid crystal precursor composition further comprises at least one of a luminescent pigment and a luminescent dye.

15. The marking of claim 1, wherein (ii) comprises heating the applied composition to a temperature of from about 55° C. to about 150° C.

16. The marking of claim 1, wherein (iv) comprises heating the at least one of the one or more areas to a temperature of from about 55° C. to about 150° C.

17. The marking of claim 1, wherein (i) comprises applying the first chiral liquid crystal precursor composition by at least one of continuous ink-jet printing, drop-on-demand ink-jet printing, spray coating, and valve-jet printing.

18. The marking of claim 1, wherein (iii) comprises applying the second chiral liquid crystal precursor composition by at least one of continuous ink-jet printing, drop-on-demand ink-jet printing, spray coating, and valve-jet printing.

19. The marking of claim 1, wherein immediately after (iii) a stream of air is passed over the one or more areas.

20. The marking of claim 1, wherein the marking is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

21. A substrate which comprises the marking of claim 1.

22. The substrate of claim 21, wherein the marking serves the function of at least one of a security element, an authenticity element, an identification element, and a tracking and tracing element.

23. The substrate of claim 21, wherein the substrate is or comprises at least one of an identity document, a label, a packaging, a banknote, a security document, a passport, a stamp, an ink-transfer film, and a reflective film.

24. A method of providing a substrate with a liquid crystal polymer marking, wherein the method comprises:
(i) applying a first chiral liquid crystal precursor composition onto a substrate;
(ii) heating the applied first chiral liquid crystal precursor composition to bring same to a first chiral liquid crystal state;
(iii) applying to one or more areas of the applied first composition at a first chiral liquid crystal state a second chiral liquid crystal precursor composition, the one or more areas being less than a total surface area of the applied composition at a first chiral liquid crystal state;
(iv) heating at least one of the one or more areas to bring same to a second chiral liquid crystal state forming a modified first chiral liquid crystal precursor in the at least one of the one or more areas; and
(v) at least one of curing and polymerizing the applied first and second compositions.

25. A substrate having a marking thereon, wherein the marking comprises a layer or film of a first chiral liquid crystal polymer having a first optical property, the layer or film comprising in at least one area thereof a second liquid crystal polymer that has at least one second optical property which is different from the first optical property, the at least one area being less than a total surface area of the layer or film.

26. The marking according to claim 1, wherein the one or more areas is less than about 99% of the total surface area of the applied composition at a first chiral liquid crystal state.

27. The marking according to claim 26, wherein the one or more areas is less than about 90% of the total surface area of the applied composition at a first chiral liquid crystal state.

28. The marking according to claim 27, wherein the one or more areas is at least about 5% of the total surface area of the applied composition at a first chiral liquid crystal state.

29. The marking according to claim 28, wherein the one or more areas is at least about 10% of the total surface area of the applied composition at a first chiral liquid crystal state.

30. The marking according to claim 1, wherein no curing or polymerization of components is carried out prior to the at least one of curing and polymerizing.

31. The method according to claim 24, wherein the one or more areas is less than about 99% of the total surface area of the applied composition at a first chiral liquid crystal state.

32. The method according to claim 31, wherein the one or more areas is less than about 90% of the total surface area of the applied composition at a first chiral liquid crystal state.

33. The method according to claim 32, wherein the one or more areas is at least about 5% of the total surface area of the applied composition at a first chiral liquid crystal state.

34. The method according to claim 33, wherein the one or more areas is at least about 10% of the total surface area of the applied composition at a first chiral liquid crystal state.

35. The method according to claim 24, wherein no curing or polymerization of components is carried out prior to the at least one of curing and polymerizing.

\* \* \* \* \*

UNITED STATES PATENT AND TRADEMARK OFFICE
CERTIFICATE OF CORRECTION

PATENT NO. : 8,426,012 B2  
APPLICATION NO. : 12/783078  
DATED : April 23, 2013  
INVENTOR(S) : Thomas Tiller et al.

Page 1 of 1

It is certified that error appears in the above-identified patent and that said Letters Patent is hereby corrected as shown below:

On the Title Page, at Item (73) Assignee, of the printed patent, "Sicpa Holding SA" should be --SICPA HOLDING SA--.

Signed and Sealed this  
Sixteenth Day of July, 2013

Teresa Stanek Rea  
*Acting Director of the United States Patent and Trademark Office*